(12) United States Patent
Cheng et al.

(10) Patent No.: US 9,812,990 B1
(45) Date of Patent: Nov. 7, 2017

(54) SPARE ON DEMAND POWER CELLS FOR MODULAR MULTILEVEL POWER CONVERTER

(71) Applicant: Rockwell Automation Technologies, Inc., Mayfield Heights, OH (US)

(72) Inventors: Zhongyuan Cheng, Kitchener (CA); Navid Reza Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/296,472

(22) Filed: Oct. 18, 2016

Related U.S. Application Data (60) Provisional application No. 62/399,560, filed on Sep. 26, 2016.

(51) Int. Cl.
  *H02M 7/538* (2007.01)
  *H02M 7/5387* (2007.01)
  *H02P 27/08* (2006.01)

(52) U.S. Cl.
  CPC ........ *H02M 7/53871* (2013.01); *H02P 27/08* (2013.01)

(58) Field of Classification Search
  CPC .. H02M 7/53871; H02M 7/5387; H02P 27/08
  See application file for complete search history.

(56) References Cited

U.S. PATENT DOCUMENTS

| | | |
|---|---|---|
| 4,443,841 A | 4/1984 | Mikami et al. |
| 4,783,728 A | 11/1988 | Hoffman |
| 4,894,621 A | 1/1990 | Koenig et al. |
| 5,298,848 A | 3/1994 | Ueda et al. |
| 5,361,196 A | 11/1994 | Tanamachi et al. |
| 5,502,633 A | 3/1996 | Miyazaki et al. |
| 5,625,545 A | 4/1997 | Hammond |
| 5,638,263 A | 6/1997 | Opal et al. |
| 5,642,275 A | 6/1997 | Peng et al. |
| 5,790,396 A | 8/1998 | Miyazaki et al. |
| 5,933,339 A | 8/1999 | Duba et al. |
| 5,986,909 A | 11/1999 | Hammond et al. |
| 6,005,788 A | 12/1999 | Lipo et al. |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

Abu-Rub et al.,"Medium-Voltage Multilevel Converters—State the Art, Chellenges, and Requirements in Industrial Applications", IEEE Transactions on Industrial Electronics, vol. 57, No. 8, Aug. 2010, pp. 2581-2596.

(Continued)

*Primary Examiner* — Emily P Pham
(74) *Attorney, Agent, or Firm* — Fay Sharpe LLP (57) ABSTRACT

Apparatus to provide bypass redundancy for a multiphase multilevel inverter including a spare inverter stage and a switch circuit to connect the spare inverter stage between a selected one of the inverter phase first nodes having a bypassed stage and a common connection node, and to connect the remaining inverter phase first nodes with the common connection node.

20 Claims, 8 Drawing Sheets

(56) References Cited

U.S. PATENT DOCUMENTS

| | | |
|---|---|---|
| 6,031,738 A | 2/2000 | Lipo et al. |
| 6,058,031 A | 5/2000 | Lyons et al. |
| 6,075,350 A | 6/2000 | Peng |
| 6,075,717 A | 6/2000 | Kumar et al. |
| 6,166,929 A | 12/2000 | Ma et al. |
| 6,222,284 B1 | 4/2001 | Hammond et al. |
| 6,229,722 B1 | 5/2001 | Ichikawa et al. |
| 6,236,580 B1 | 5/2001 | Aiello et al. |
| 6,269,010 B1 | 7/2001 | Ma et al. |
| 6,295,215 B1 | 9/2001 | Faria et al. |
| 6,320,767 B1 | 11/2001 | Shimoura et al. |
| 6,359,416 B1 | 3/2002 | Rao et al. |
| 6,366,483 B1 | 4/2002 | Ma et al. |
| 6,411,530 B2 | 6/2002 | Hammond et al. |
| 6,469,916 B1 | 10/2002 | Kerkman et al. |
| 6,477,067 B1 | 11/2002 | Kerkman et al. |
| 6,541,933 B1 | 4/2003 | Leggate et al. |
| 6,556,461 B1 | 4/2003 | Khersonsky et al. |
| 6,617,821 B2 | 9/2003 | Kerkman et al. |
| 6,636,012 B2 | 10/2003 | Royak et al. |
| RE38,439 E | 2/2004 | Czerwinski |
| 6,697,271 B2 | 2/2004 | Corzine |
| 6,697,274 B2 | 2/2004 | Bernet et al. |
| 6,703,809 B2 | 3/2004 | Royak et al. |
| 6,720,748 B1 | 4/2004 | Seibel et al. |
| 6,795,323 B2 | 9/2004 | Tanaka et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,859,374 B2 | 2/2005 | Pollanen et al. |
| 6,982,533 B2 | 1/2006 | Seibel et al. |
| 7,034,501 B1 | 4/2006 | Thunes et al. |
| 7,057,905 B2 | 6/2006 | Macmillan |
| 7,068,526 B2 | 6/2006 | Yamanaka |
| 7,106,025 B1 | 9/2006 | Yin et al. |
| 7,164,254 B2 | 1/2007 | Kerkman et al. |
| 7,170,767 B2 | 1/2007 | Bixel |
| 7,180,270 B2 | 2/2007 | Rufer |
| 7,215,559 B2 | 5/2007 | Nondahl et al. |
| 7,274,576 B1 | 9/2007 | Zargari et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,428,158 B2 | 9/2008 | Bousfield, III et al. |
| 7,471,525 B2 | 12/2008 | Suzuki et al. |
| 7,495,410 B2 | 2/2009 | Zargari et al. |
| 7,495,938 B2 | 2/2009 | Wu et al. |
| 7,511,976 B2 | 3/2009 | Zargari et al. |
| 7,568,931 B2 | 8/2009 | Hammond |
| 7,589,984 B2 | 9/2009 | Salomaki |
| 7,649,281 B2 | 1/2010 | Lai et al. |
| 7,800,254 B2 | 9/2010 | Hammond |
| 7,830,681 B2 | 11/2010 | Abolhassani et al. |
| 7,894,224 B2 | 2/2011 | Ulrich |
| 7,978,488 B2 | 7/2011 | Tanaka et al. |
| 8,008,923 B2 | 8/2011 | Hammond |
| 8,040,101 B2 | 10/2011 | Itoh et al. |
| 8,093,764 B2 | 1/2012 | Hammond |
| 8,107,267 B2 | 1/2012 | Tallam et al. |
| 8,130,501 B2 | 3/2012 | Ledezma et al. |
| 8,138,697 B2 | 3/2012 | Palma |
| 8,144,491 B2 | 3/2012 | Bendre et al. |
| 8,159,840 B2 | 4/2012 | Yun |
| 8,279,640 B2 | 10/2012 | Abolhassani et al. |
| 8,400,793 B2 | 3/2013 | Jonsson |
| 8,441,147 B2 | 5/2013 | Hammond |
| 8,508,066 B2 | 8/2013 | Lee et al. |
| 8,619,446 B2 | 12/2013 | Liu et al. |
| 8,817,499 B2 | 8/2014 | Videt |
| 8,860,380 B2 | 10/2014 | Hasler |
| 8,929,111 B2 | 1/2015 | White |
| 8,982,593 B2 * | 3/2015 | Nondahl ............ H02M 1/12 363/36 |
| 9,036,379 B2 | 5/2015 | Schroeder |
| 9,240,731 B2 * | 1/2016 | Wei ............... H02M 5/458 |
| 2001/0048290 A1 | 12/2001 | Underwood et al. |
| 2007/0211501 A1 | 9/2007 | Zargari et al. |
| 2007/0297202 A1 | 12/2007 | Zargari et al. |
| 2008/0079314 A1 | 4/2008 | Hammond |
| 2008/0174182 A1 | 7/2008 | Hammond |
| 2008/0180055 A1 | 7/2008 | Zargari et al. |
| 2009/0073622 A1 | 3/2009 | Hammond |
| 2009/0085510 A1 | 4/2009 | Pande et al. |
| 2009/0128083 A1 | 5/2009 | Zargari |
| 2009/0184681 A1 | 7/2009 | Kuno |
| 2010/0025995 A1 | 2/2010 | Lang et al. |
| 2010/0078998 A1 | 4/2010 | Wei et al. |
| 2010/0080028 A1 | 4/2010 | Cheng et al. |
| 2010/0085789 A1 | 4/2010 | Ulrich et al. |
| 2010/0091534 A1 | 4/2010 | Tadano |
| 2010/0109585 A1 | 5/2010 | Iwahori et al. |
| 2010/0141041 A1 | 6/2010 | Bose et al. |
| 2010/0301975 A1 | 12/2010 | Hammond |
| 2011/0019449 A1 | 1/2011 | Katoh et al. |
| 2011/0095603 A1 | 4/2011 | Lee et al. |
| 2011/0249479 A1 | 10/2011 | Capitaneanu et al. |
| 2012/0057380 A1 | 3/2012 | Abe |
| 2012/0057384 A1 | 3/2012 | Jones |
| 2012/0113698 A1 | 5/2012 | Inoue |
| 2012/0195078 A1 | 8/2012 | Levin et al. |
| 2012/0195079 A1 | 8/2012 | Kroeze et al. |
| 2012/0201056 A1 | 8/2012 | Wei et al. |
| 2012/0212982 A1 | 8/2012 | Wei et al. |
| 2012/0218795 A1 | 8/2012 | Mihalache |
| 2013/0121041 A1 | 5/2013 | Schroeder et al. |
| 2013/0121042 A1 | 5/2013 | Gan et al. |
| 2013/0223651 A1 | 8/2013 | Hoyerby |
| 2013/0272045 A1 | 10/2013 | Soeiro |
| 2014/0003099 A1 | 1/2014 | Dillig et al. |
| 2014/0036557 A1 | 2/2014 | Liu et al. |
| 2014/0042817 A1 | 2/2014 | Zargari et al. |
| 2014/0063870 A1 | 3/2014 | Bousfield, III |
| 2014/0146586 A1 | 5/2014 | Das et al. |
| 2014/0204632 A1 | 7/2014 | Noetzold et al. |
| 2014/0268928 A1 | 9/2014 | Wei et al. |
| 2014/0376287 A1 | 12/2014 | Wu et al. |
| 2015/0280608 A1 | 10/2015 | Yoscovich et al. |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 1400731 A | 3/2005 |
| CN | 2737060 | 10/2005 |
| CN | 1925289 | 3/2007 |
| CN | 101795057 A | 8/2010 |
| CN | 102005960 A | 4/2011 |
| CN | 102522913 A | 6/2012 |
| CN | 102624025 A | 8/2012 |
| CN | 102739030 A | 10/2012 |
| CN | 102983568 A | 3/2013 |
| CN | 103051167 A | 4/2013 |
| CN | 103051236 A | 4/2013 |
| CN | 103078539 A | 5/2013 |
| EP | 0874448 | 10/1998 |
| EP | 1641111 A2 | 3/2006 |
| EP | 1713168 A3 | 10/2006 |
| EP | 2568591 A1 | 3/2013 |
| EP | 2698912 A2 | 2/2014 |
| EP | 2838189 A2 | 2/2015 |
| ES | 2378865 | 4/2012 |
| GB | 1295261 A | 11/1972 |
| GB | 2345594 A | 7/2000 |
| JP | 2006223009 | 8/2006 |
| JP | 2013012674 | 1/2013 |
| KR | 20080061641 A | 7/2008 |
| TW | 439350 | 6/2001 |
| WO | WO2012105737 A1 | 8/2012 |
| WO | WO2013091675 A1 | 6/2013 |
| WO | WO 2013/104418 A1 | 7/2013 |

(56) References Cited

FOREIGN PATENT DOCUMENTS

OTHER PUBLICATIONS

Akagi et al., "A Passive EMI Filter for Eliminating Both Bearing Current and Ground Leakage Current From an Inverter-Driven Motor", IEEE Transactions on Power Electronics, 2006, pp. 1459-1469.
Akagi et al., "An Approach to Eliminating High-Frequency Shaft Voltage and Ground Leakage Current From an Inverter-Driven Motor", IEEE Transactions on Industry Applications, 2004, pp. 1162-1169.
Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.
Angulo, Mauricio, et al., "Level-shifted PMW for Cascaded Multilevel Inverters with Even Power Distribution", IEEE Power Electronics Specialists Conference (PESC), pp. 2373-2378, Jun. 2007.
Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.
Barbosa et al., "Active neutral-point-clamped multilevel converters," in Proc. IEEE 36th Power Electron. Spec. Conf., Jun. 16, 2005, pp. 2296-2301.
Bruckner et al., "The active NPC converter and its loss-balancing control," IEEE Trans. Ind. Electron., vol. 52, No. 3, pp. 855-868, Jun. 2005.
Cacciato et al., "Modified space-vector-modulation technique for common mode currents reduction and full utilization of the DC bus", in Proc. IEEE APEC Conf. Rec., 2009, pp. 109-115.
Cacciato et al., "Reduction of common mode currents in PWM inverter motor drives", IEEE Trans. Ind. Appl., vol. 35, No. 2, pp. 469-476, Mar./Apr. 1999.
Cavalcanti et al., "Modulation Techniques to Eliminate Leakage Currents in Transformerless Three-Phase Photovoltaic Systems", IEEE Transactions on Industrial Electronics, 2010, pp. 1360-1368.
Celanovic et al., "A Comprehensive Study of Neutral-Point Voltage Balancing Problem in Three-Level Neutral-Point-Clamped Voltage Source PWM Inverters", IEEE Transactions on Power Electronics, vol. 15, No. 2, Mar. 2000, pp. 242-249.
Cengelci, E., et al., A New Medium Voltage PWM Inverter Topology for Adjustable Speed Drives, IEEE, 0/7803-4943-1, 1998, pp. 1416-1423.
Cha, Han Ju et al. An Approach to Reduce Common-Mode Voltage in Matrix Converter, Jul./Aug. 2003, IEEE, vol. 39, pp. 1151-1159.
Cha, Han Ju, "Analysis and Design of Matrix Converter for Adjustable Speed Drive and Distributed Power Sources", Aug. 2004, Texas A&M Univ., Doctor of Philosophy Dissertation Paper.
Chaudhuri, Toufann, et al., Introducing the Common Cross Connected Stage ($C^3S$) for the 5L ANPC Multilevel Inverter, IEEE, 978-1-4244-1668-4, 2008, pp. 167-173.
Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.
Choi et al., "A General Circuit Topology of Multilevel Inverter", Dept. of Electrical Engineering, Korea Advanced Institute of Science and Technology (KAIST), 1991 IEEE, 8 pgs.
De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.
Erdman, Russel J. Kerkman, David W. Schlegel, and Gary L. Skibinski, "Effect of PWM Inverters on AC Motor Bearing Currents and Shaft Voltages", 1996 IEEE.
Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Floricau, Dan et al., A new stacked NPC converter: 3L-topology and control, Proceedings of the $12^{th}$ European Conf. on Power Electronics and Applications, EPE 2007, EPE Association, 2007, 10 pgs.
Glinka, M., Prototype of Multiphase Modular-Multilevel-Converter with 2 MW power rating and 17- level-output-voltage, IEEE, 0-7803-8399-0, 2004, pp. 2572-2576.
Guennegues et al., "Selective harmonic elimination PWM applied to H-bridge topology in high speed applications," in Proc. Int. Conf. Powereng, Mar. 18-20, 2009, pp. 152-156.
Guennegues, V., et al., A Converter Topology for High Speed Motor Drive Applications, IEEE Xplore, 2009, 8 pgs.
Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.
Hava et al., "A high-performance PWM algorithm for common-mode voltage reduction in three-phase voltage source inverters," IEEE Trans. Power Electron., vol. 26, No. 7, pp. 1998-2008, Jul. 2011.
Hiller, Mark et al., Medium-Voltage Drives; An overview of the common converter topologies and power semiconductor devices, IEEE Industry Applications Magazine, Mar.-Apr. 2010, pp. 22-30.
Horvath, "How isolation transformers in MV drives protect motor insulation", TM GE Automation Systems, Roanoke, VA, 2004.
Hua, Lin, "A Modulation Strategy to Reduce Common-Mode Voltage for Current-Controlled Matrix Converters", Nov. 2006, IEEE Xplore, pp. 2775-2780.
Iman-Eini, Hossein et al., "A Fault-Tolerant Control Strategy for Cascaded H-Bridge Multilevel Rectifiers", Journal of Power Electronics, vol. 1, Jan. 2010.
Kerkman, et al., "PWM Inverters and Their Influence on Motor Over-Voltage," 1997 IEEE.
Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.
Kieferndorf et al., "A new medium voltage drive system based on anpc-5l technology," in Proc. IEEE-ICIT, Viña del Mar, Chile, Mar. 2010, pp. 605-611.
Kim et al., "A New PWM Strategy for Common-Mode Voltage Reduction in Neutral-Point-Clamped Inverter-Fed AC Motor Drives", IEEE Translations on Industry Applications, vol. 37, No. 6, Nov. 2001; pp. 1480-1845.
Kouro et al., "Recent advances and industrial applications of multilevel converters," IEEE Trans. Ind. Electron., vol. 57, No. 8, pp. 2553-2580, Aug. 2010.
Lai et al., "Optimal common-mode voltage reduction PWM technique for inverter control with consideration of the dead-time effects—part I: basic development," IEEE Trans. Ind. Appl., vol. 40, No. 6, pp. 1605-1612, Nov./Dec. 2004.
Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.
Lesnicar et al., "An Innovative Modular Multilevel Converter Topology Suitable for a Wide Power Range", 2003 IEEE Bologna PowerTech Conference, Jun. 23-26, Bologna Italy, 6 pgs.
Lesnicar, A., et al., A new modular voltage source inverter topology, Inst. of Power Electronics and Control, Muenchen, DE, Oct. 10, 2007, pp. 1-10.
Lezana, Pablo et al., "Survey on Fault Operation on Multilevel Inverters", IEEE Transactions on Industrial Electronics, vol. 57, No. 7, Jul. 2010, pp. 2207-2217.
Li, Jun, et al., A New Nine-Level Active NPC (ANPC) Converter for Grid Connection of Large Wind Turboines for Distributed Generation, IEEE Transactions on Power Electronics, vol. 26, No. 3, Mar. 2011, pp. 961-972.
Loh et al., "Reduced Common-Mode Modulation Strategies for Cascaded Multilevel Inverters", IEEE Transaction on Industry Applications, vol. 39, No. 5, Sep. 2003, pp. 1386-1395.
McGrath, Brendan Peter et al., "Multicarrier PMW Strategies for Multilevel Inverters," IEEE Transactions on Industrial Electronics, vol. 49, No. 4, pp. 858-867, Aug. 2002.

(56) References Cited

OTHER PUBLICATIONS

Meili et al., "Optimized pulse patterns for the 5-level ANPC converter for high speed high power applications," in Proc. 32nd IEEE IECON, Nov. 6-10, 2006, pp. 2587-2592.

Muetze, & A. Binder, "Don't lose Your Bearings", Mitigation techniques for bearing currents in inverter-supplied drive systems, 2006 IEEE.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Park, Young-Min, "A Simple and Reliable PWM Synchronization & Phase-Shift Method for Cascaded H-Bridge Multilevel Inverters based on a Standard Serial Communication Protocol", IEEE $41^{st}$ IAS Annual Meeting, pp. 988-994, Oct. 2006.

Peng, "A Generalized Multilevel Inverter Topology with Self Voltage Balancing", IEEE Transactions on Industry Applications, vol. 37, No. 2, Mar./Apr. 2001, pp. 611-618.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.

Robicon Perfect Harmony, "Medium-Voltage Liquid-Cooled Drives", Siemens, Catalog D 15.1, 2012, USA Edition, obtained from the WorldWide Web Apr. 2013, 91 pgs. (Downloaded to EFS Web as Part 1, pp. 1-4; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Robicon, "Perfect Harmony MV Drive Product Overview", 18 pgs.. obtained from the World Wide Web Apr. 2013.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Rodriguez et al., "Multilevel inverters: A survey of topologies, controls, and applications," IEEE Trans. Ind. Electron., vol. 49, No. 4, pp. 724-738, Aug. 2002.

Rodriguez et al., "Operation of a Medium-Voltage Drive Under Faulty Conditions", IEEE Transactions on Industrial Electronics, vol. 52, No. 4, Aug. 2005, pp. 1080-1085.

Rodriguez, et al., "Multilevel voltage source- converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Saeedifard, Maryann et al., Analysis and Control of DC-Capacitor-Voltage-Drift Phenomenon of a Passive Front-End Five-Level Converter, IEEE Transactions on Industrial Electronics, vol. 54, No. 6, Dec. 2007, pp. 3255-3266.

Sedghi, S. et al., "A New Multilevel Carrier Based Pulse Width Modulation Method for Modular Multilevel Inverter", IEEE, $8^{th}$ International Conference on Power Electronics—ECCE Asia (ICPE & ECCE), pp. 1432-1439, May 30-Jun. 3, 2011.

Sepahvand, Hossein et al., "Fault Recovery Strategy for Hybrid Cascaded H-Bridge Multi-Level Inverters", 2011 IEEE, pp. 1629-1633.

Serpa et al., "Fivelevel virtual-flux direct power control for the active neutral-point clamped multilevel inverter," in Proc. IEEE Power Electron. Spec. Conf.

Silva, Cesar et al., Control of an Hybrid Multilevel Inverter for Current Waveform Improvement, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., Floating Capacitor Voltage Regulation in Diode Clamped Hybrid Multilevel Converters, IEEE, 978-1-4244-3439-8, 2009, pp. 197-202.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., Synthesis of Multilevel Converters Based on Single-and/or Three-Phase Converter Building Blocks, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

Zhang et al., "A Multilevel Converter Topology with Common Flying Capacitors", IEEE 978-1-4799-0336, 2013, pp. 1274-1280.

Zhang et al., "Multilevel Inverter Modulation Schemes to Eliminate Common-Mode Voltages", IEEE Transactions on Industry Applications, vol. 36, No. 6, Nov./Dec. 2000, pp. 1645-1653.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012 , pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Suppression in Neutral-Connected Power Converter Systems. IEEE Transactions on Power Electronics, 2012 , pp. 1228-1236.

\* cited by examiner

SPARE ON DEMAND POWER CELLS FOR MODULAR MULTILEVEL POWER CONVERTER

REFERENCE TO RELATED APPLICATION

The present application claims priority to, and the benefit of, U.S. Provisional Application No. 62/399,560, filed Sep. 26, 2016, the subject matter of which is incorporated herein by reference in its entirety.

BACKGROUND INFORMATION

The subject matter disclosed herein relates to modular multilevel power conversion systems.

BRIEF DESCRIPTION

Disclosed examples include apparatus and methods to provide bypass redundancy for a multiphase multilevel inverter including a spare inverter stage and a switch circuit to connect the spare inverter stage between a selected one of the inverter phase first nodes having a bypassed stage and a common connection node, and to connect the remaining inverter phase first nodes with the common connection node.

DETAILED DESCRIPTION

Power conversion systems convert input electrical energy from one form to another to drive a load. One form of power conversion system is a motor drive for variable speed operation of an electric motor load. Multilevel converters are sometimes used for high voltage motor drive applications, including flying capacitor designs, neutral point clamped (NPC) designs, cascaded NPC (CNPC) designs, cascaded H-bridge (CHB) designs as well as other cascaded and hybrid topologies. Modular multilevel converters provide a single phase or multiphase output to drive a load using modules, sometimes referred to as cells or stages, connected in series with one another between a common connection point (e.g., a neutral connection) and a driven load. In a three-phase example, three phase leg circuits each include two or more inverter modules whose outputs are connected in series with one another between the neutral point and a driven motor phase. In each phase leg circuit, the individual stages can provide one of two or more output voltage levels at any given time, and the series connection of multiple stages provides an output voltage for the corresponding phase load. The individual stages, moreover, provide inverter type operation to generate one of two or more output voltage levels using internal switches.

Because the inverter stages are connected in series, a failure or fault in one of the stages can cause a disruption in the output power provided to the driven load. Accordingly, bypass circuitry is often included in the individual stages or externally provided, in order to selectively short-circuit the output of a faulted inverter stage. This allows the remaining stages in the corresponding phase leg circuit to continue delivering output power to the load. In such situations, it is desired to provide redundancy to temporarily replace a faulted inverter stage with a backup or spare inverter stage. In general, for a multiphase, multilevel converter that requires an integer number N inverter stages connected in each phase leg circuit to accommodate a specific output voltage requirement, n+1 redundancy protects against single inverter stage faults. This is done by adding an additional inverter stage in each phase leg circuit, and operating the N+1 series-connected stages at a correspondingly reduced modulation index. This so-called "hot redundancy" can provide automatic bypassing of a faulted inverter stage, and a corresponding increase in the modulation index of the remaining inverter modules to continue operation of the system until manual replacement of the faulted inverter stage can be accommodated. Similarly, n+2 redundancy provides for conditions in which two inverter stages are concurrently faulted by adding two extra inverter stages per phase leg circuit. These approaches, however, require the addition of one or two extra inverter stages for each phase (e.g., three extra inverter stages for n+1 redundancy in a three-phase system). This increases the cost, weight and size of the resulting power converter system.

Another approach involves storing spare or backup inverter stages, and manually replacing a faulted inverter stage. This so-called "cold redundancy" approach, however, results in system downtime. In addition, capacitors of the stored backup inverter stages degrade over time due to degradation of aluminum oxide layers in aluminum capacitors used in the inverter stage. This aluminum oxide degradation results from non-use of a given inverter stage, and steps can be taken to restore or reform the aluminum oxide material by application of voltage to the stage capacitor. However, such additional steps require time and equipment to ensure that the backup inverter stage is ready for operation when needed.

Disclosed examples advantageously provide non-demand spare inverter stage availability, which can be automated to selectively connect a spare inverter stage into a phase leg circuit in which another inverter stage has been bypassed. Rather than providing three extra inverter stages in each phase leg of a three-phase system, the presently disclosed techniques can use a single spare inverter stage and associated switch circuitry to provide n+1 hot redundancy, where the redundant inverter stage can be selectively connected to any phase. Similarly, two spare inverter stages can be provided with an associated switch circuit to implement n+2 hot redundancy. The disclosed apparatus and techniques, moreover, can be used in association with any type or form of inverter modular stage, including without limitation CHB, CNPC stages, and can be used with external or internal cell bypass configurations.

Figure 1:
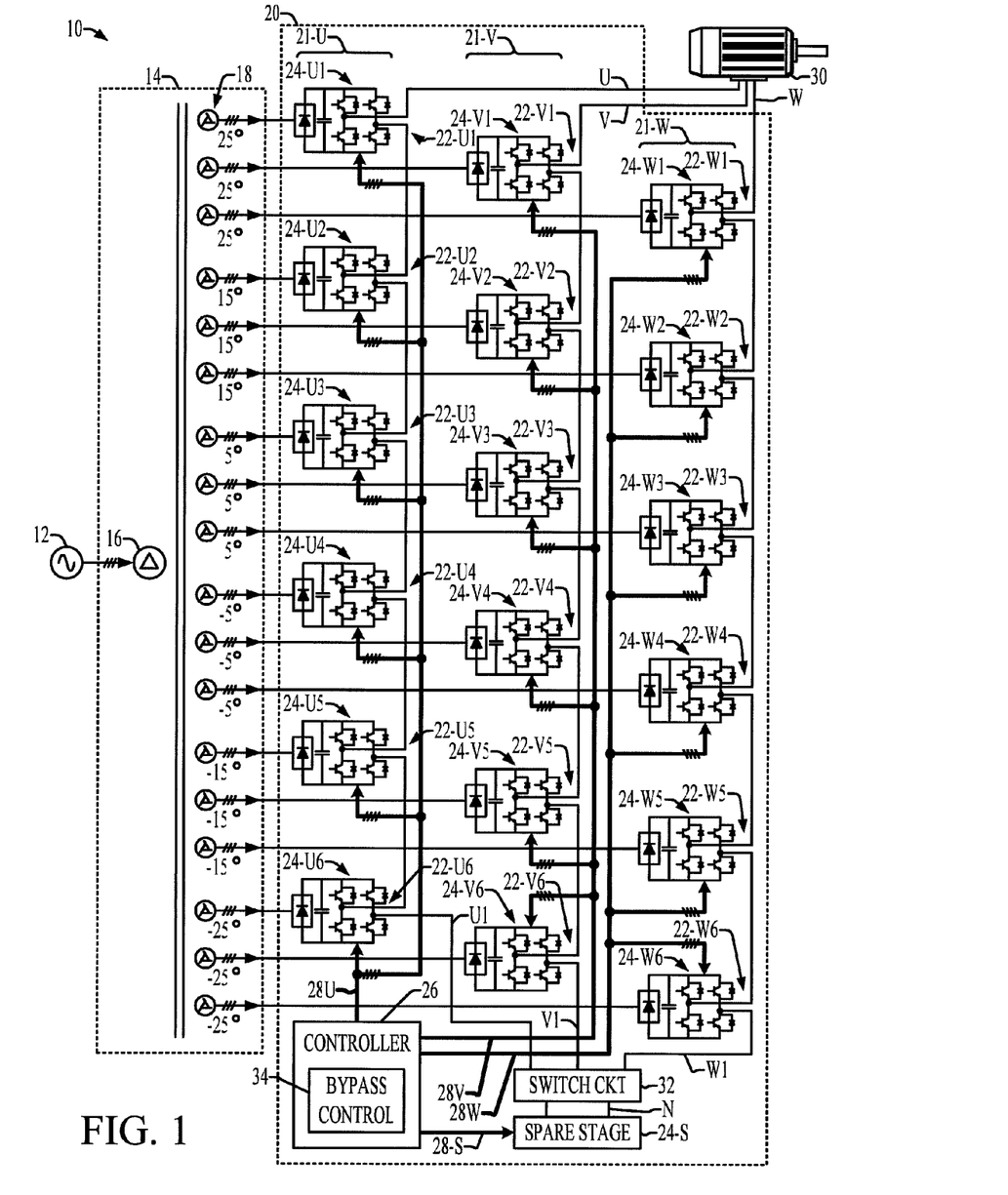
FIGS. 1-7 are schematic diagrams.

Referring initially to FIG. 1, disclosed examples include apparatus and systems 24-S, 32 to provide bypass redundancy for a multiphase multilevel inverter 20 including a spare inverter stage 24-S and a switch circuit 32 to connect the spare inverter stage 24-S between a selected one of three inverter phase first nodes U1, V1, W1 associated with a bypassed stage or cell 24 and a common connection node (e.g., an output neutral "N"), and to connect the remaining inverter phase first nodes U1, V1, W1 with the neutral N. FIG. 1 shows an example power conversion system 10 with a three-phase 13-level CHB inverter-based motor drive 20 with a controller 26 providing switching control signals 28 to CHB inverter stages 24 (labelled "CELL" or "STAGE" in the drawings). Although illustrated in the context of a multiphase 13-level inverter 20 with six inverter stages 24 for each of three motor load phases U, V and W, the various aspects of the present disclosure may be implemented in association with single phase or multiphase, multilevel inverters having any integer number "N" inverter stages 24 in each phase leg circuit 21, where N is greater than one (e.g., 9-level or higher level inverters). In addition, although the illustrated embodiments utilize H-Bridge stages 24 cascaded to form multilevel inverters 20 for each phase of the motor drive system 10, NPC or other types and forms of inverter stages 24 can be used, such as a stage with a switching circuit having more or less than four switching devices, wherein the broader aspects of the present disclosure are not limited in scope by the illustrated embodiments.

The motor drive system 10 in FIG. 1 includes a phase shift transformer 14 having a multiphase primary 16 (a delta configuration in the illustrated embodiment) receiving three-phase power from an AC power source 12. The transformer 14 includes 18 three-phase secondaries 18, comprised of six sets of three extended-delta-configured three-phase secondaries 18, with each set being at a different phase relationship. Although the primary 16 and the secondaries 18 are configured as delta and extended-delta windings in the illustrated example, "Y" connected primary windings and/or zigzag-connected secondary windings can alternatively be used. In addition, while the transformer has three-phase primary and secondary windings 16, 18, other single or multiphase implementations can be used. Each of the three-phase secondaries 18 is coupled to provide AC power to drive a three-phase rectifier of a corresponding inverter stage 24 of the three-phase multilevel inverter 20. In this example, the individual inverter stages 24 include on-board rectifier circuits. In other examples, the inverter modules or stages 24 can be configured to directly receive DC power from an external DC source (not shown).

The multilevel inverter 20 includes three inverter phase leg circuits 21-U, 21-V and 21-W. The individual inverter phase leg circuits 21-U, 21-V and 21-W include six inverter stages 24 connected in series between corresponding inverter phase output node (e.g., motor lead) U, V or W and a corresponding inverter phase first node U1, V1 or W1 to provide a phase voltage signal at the inverter phase output node U, V or W. The inverter 20 in this example includes 18 inverter stages 24, each connected to a corresponding secondary 18 of the transformer 14 as shown. The inverter 20 is a 13-level inverter with N=6 cascaded H-Bridge inverter stages 24U-1 through 24U-6 of a first inverter phase leg circuit 21-U having outputs 22U-1 through 22U-6 connected in series with one another (cascaded) between an inverter phase first node U1 and a first winding U of a three-phase motor load 30. Six inverter stages 24V-1 through 24V-6 of a second inverter phase leg circuit 21-V provide series connected voltage outputs 22V-1 through 22V-6 between an inverter phase first node V1 and the second motor phase winding V, and six inverter stages 24W-1 through 24W-6 of a third inverter phase leg circuit 21-W provide series connected voltage outputs 22W-1 through 22W-6 between the third winding W of the motor 30 and the final inverter phase first node W1. A switch circuit 32 operates in a first mode (e.g., normal mode operation) to connect the three inverter phase first nodes U1, V1 and W1 to a motor drive neutral point or other common connection node N.

The inverter stages 24 are individually operable according to a plurality of switching control signals 28 from the controller 26. The controller 26 provides control signals 28U to the inverter stages 24U-1 through 24U-6 associated with the first motor winding U, and also provides control signals 28V to the inverter stages 24V-1 through 24V-6 and control signals 28W to the inverter stages 24W-1 through 24W-6. The controller 26 also includes a bypass control component or circuit 34 that operates the switch circuit 32 in order to selectively couple a spare cell 24-S into one of the series-connected phase leg circuits 21-U, 21-V or 21-W to provide n+1 hot redundancy in the converter 20.

Figure 2:
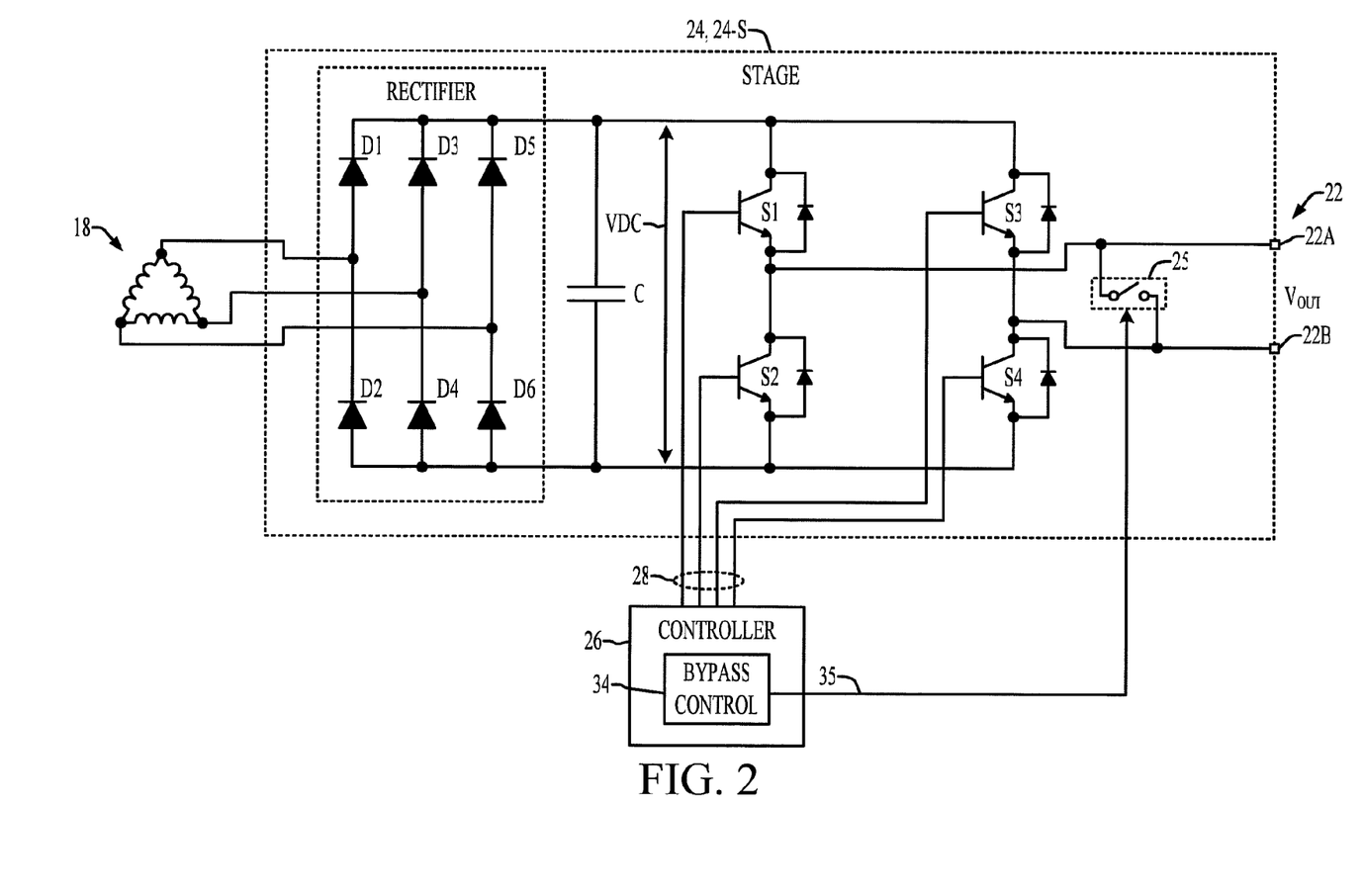

FIG. 2 shows further details of an example H-Bridge inverter stage 24 having onboard rectifier diodes D1-D6 forming a three-phase rectifier which receives three-phase AC power from the corresponding transformer secondary 18 and provides DC power across a DC capacitor C as an input to an H-Bridge inverter formed by four switching devices S1-S4 configured in an "H" bridge circuit. Although the illustrated inverter stages 24 each include rectifier circuitry driven by an AC input from the corresponding transformer secondary 18, any suitable form of a DC input can be provided to the inverter stages 24 in accordance with the present disclosure, and the inverter stages 24 may, but need not, include onboard rectification circuitry. In addition, any suitable switching circuit configuration can be used in the individual stages 24 having at least two switching devices S configured to selectively provide voltage at the stage output 22 of at least two distinct levels. Moreover, any suitable type of switching devices S may be used in the inverter stages 24, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc.

The H-Bridge circuit in FIG. 2 allows selective switching control signal generation by the controller 26 to provide at least two distinct voltage levels at the output 22 in a controlled fashion. For instance, a positive voltage is provided at the output terminals 22A and 22B of a positive DC level substantially equal to the DC bus voltage VDC across the capacitor C (+VDC) when the switching devices S1 and S4 are turned on (conductive) while the other devices S2 and S3 are off (nonconductive). Turning switches S2 and S3 on while S1 and S4 are off results in a negative voltage (−VDC) being applied at the output 22. With switches S1 and S3 turned on and S2-S4 off, or vice versa, the output voltage of the stage 24 is zero V. Accordingly, the exemplary H-Bridge inverter stage 24 advantageously allows selection of three different output voltages, and the cascaded configuration of six such stages (e.g., FIGS. 1 and 3) allows selective switching control signal generation by the controller 26 to implement 13 different voltage levels for application to the corresponding motor phase. It is noted that other possible switching circuitry may be used to implement a 2, 3, or K-level selectable output for individual stages 24, where K is an integer greater than 1. In other examples, and on-board or external bypass switch circuit 25 is provided to selectively short-circuit the output terminal 22A and 22B of the stage 24 according to a control signal 35 provided by the bypass control component or circuit 34. As detailed further below, moreover, the example of FIG. 2 can be used as the spare inverter stage 24-S for redundancy in the multiphase multilevel inverter 20.

The controller 26 provides individual switching control signals 28 to each of the switching devices S1-S4 in the illustrated example, although certain of the switching control signals may be combined or shared in some embodiments. For instance, a single control signal 28 may be provided to the switching devices S1 and S2, with another shared control signal 28 being used to actuate the switches S3 and S4. The controller may also generate signals for devices S1 and S3 only, while complementary signals for devices S2 and S4 are generated by the gating unit of the device gate drivers (not shown in FIG. 2). The controller 26 generates the switching control signals 28 using any suitable pulse width modulation technique, such as comparison of one or more carrier waveform signals or values 43, 45 associated with each given inverter stage 24 with a reference signal or value. In addition, the controller 26 can implement any suitable closed loop feedback control in order to operate the motor 30 or other driven load, for example, to implement speed and/or torque control by changing a modulation index to set the pulse width modulation on time or off-time duration in each of a plurality of switching control cycles. In particular, the modulation index determines the amplitude or level of the AC voltage is applied to the motor leads U, V and W through switched operation of the series-connected inverter stages 24 in each of the phase leg circuits 21.

Figure 3:
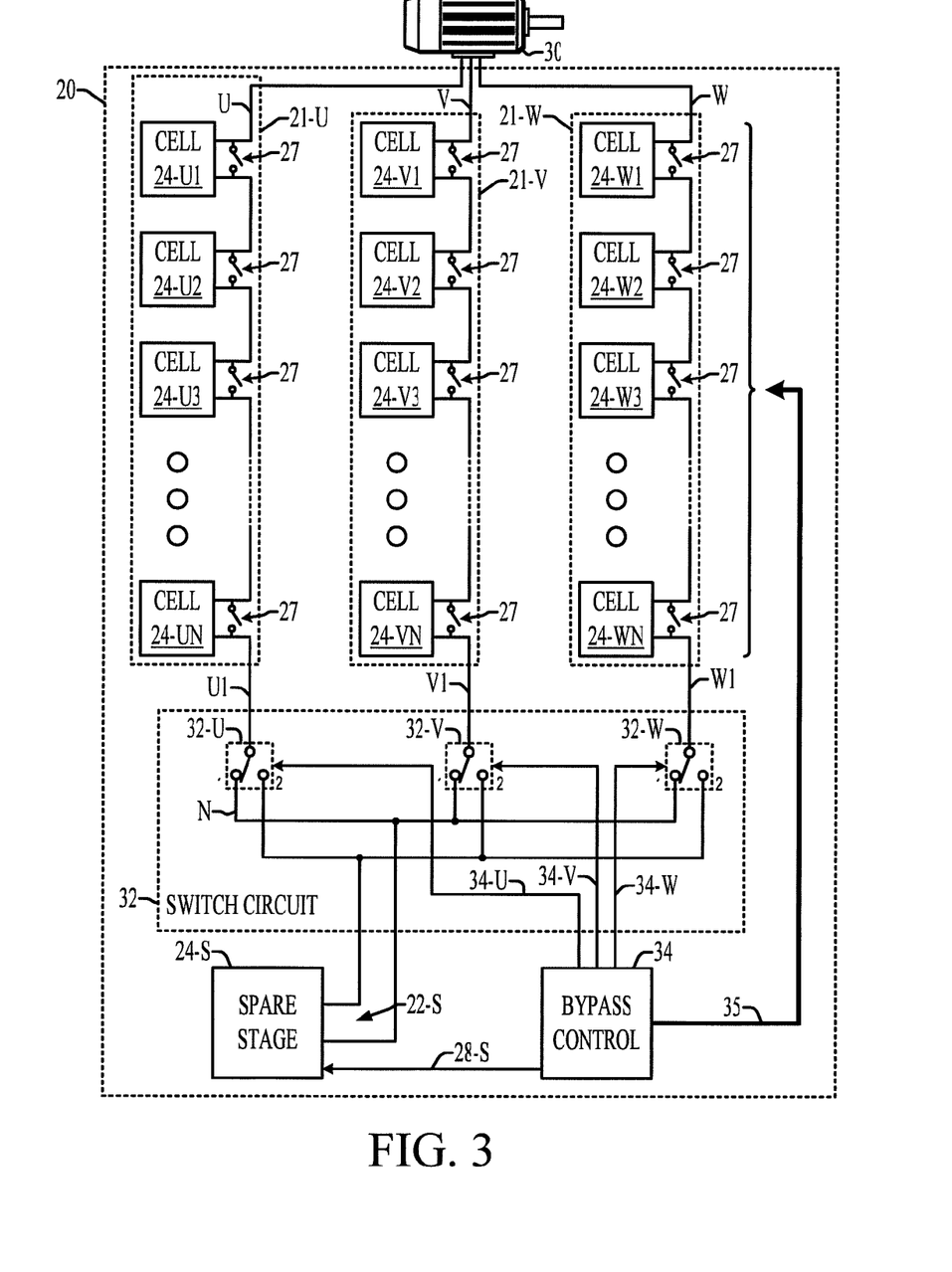

Referring also to FIG. 3, the multiphase multilevel inverter 20 also includes a spare stage system with one or more spare inverter stages 24-S and a switch circuit 32. The spare inverter stage 24-S in one example is configured as shown in FIG. 2, including a spare stage output 22-S, and a spare stage switching circuit with spare stage switching devices S1-S4 coupled between a spare stage DC voltage source and the spare stage output 22-S. As previously mentioned, the spare cell or spare stage 24-S can include internal bypass circuitry (not shown in FIG. 3), or itself can have an external bypass circuit to selectively short the terminals of its output 22-S. The spare stage switching circuit S1-S4 provides an output voltage VOUT having an amplitude of one of at least two discrete levels at the spare stage output 22-S according to a plurality of spare stage switching control signals 28-S. Other types and forms of spare stage circuits 24-S can be used, such as NPC configurations, or other switch circuits having two or more switches to provide an output voltage having one of at least two distinct levels or states according to the switching control signals 28-S from the controller 26. In the example of FIG. 3, the inverter stages 24 of the phase leg circuits 21 are provided with external bypass switches 27 operated by a corresponding switching control signals (not shown) from the bypass control circuit 34. FIG. 3 illustrates a general case in which each phase leg circuit 21 includes an integer number N cells or stages (e.g., 24-U1 through 24-UN, 24-V1 through 24-VN, and 24-W1 through 24-WN), in which the lowermost stage is connected to the phase first node U1, V1 or W1.

The switch circuit 32 operates in a first mode (normal) or in a second mode (bypass). In the first mode, the switch circuit 32 connects all the inverter phase first nodes U1, V1 and W1 to the common connection node (e.g., neutral N). In the second mode, the switch circuit 32 implements bypass operation to connect the spare inverter stage 24-S between a selected one of the inverter phase first nodes U1, V1 or W1 and the common connection node N, while maintaining connection of the remaining inverter phase first nodes U1, V1 or W1 with the common connection node N. In this manner, the circuit 32 effectively substitutes a bypassed (e.g., faulted) inverter stage 24 with the spare stage 24-S. The switch circuit 32 in this example includes single pole, double throw switches 32-U, 32-V and 32-W operated according to bypass control circuit 34 provides select control signals 34-U, 34-V, 34-W to selectively connected a selected given one of the inverter phase first nodes U1, V1 or W1 to the spare stage 24-S while maintaining connection of the other inverter phase first nodes U1, V1 or W1 to the neutral N. In this manner, the spare stage 24-S can be selectively inserted into one of the phase leg circuits 21 as needed to substitute for a bypassed inverter stage 24 of that leg circuit 21. In normal (first mode) operation, all the switches 32-U, 32-V and 32-W are in a first state or position to connect all the nodes U1, V1 and W1 to the neutral N.

Switches 25 in FIG. 2 and switches 27 in FIG. 3 are shown single-pole single-throw type for illustration only. They can be single-pole multi-throw or multi-pole multi-throw mechanical switches. Switches 25 in FIG. 2, and switches 27, 32-U, 32-V and 32-W in FIG. 3 can also be electronic switches formed by combinations of diodes, IGBTs and SCRs can also be used for this purpose.

Figure 4:
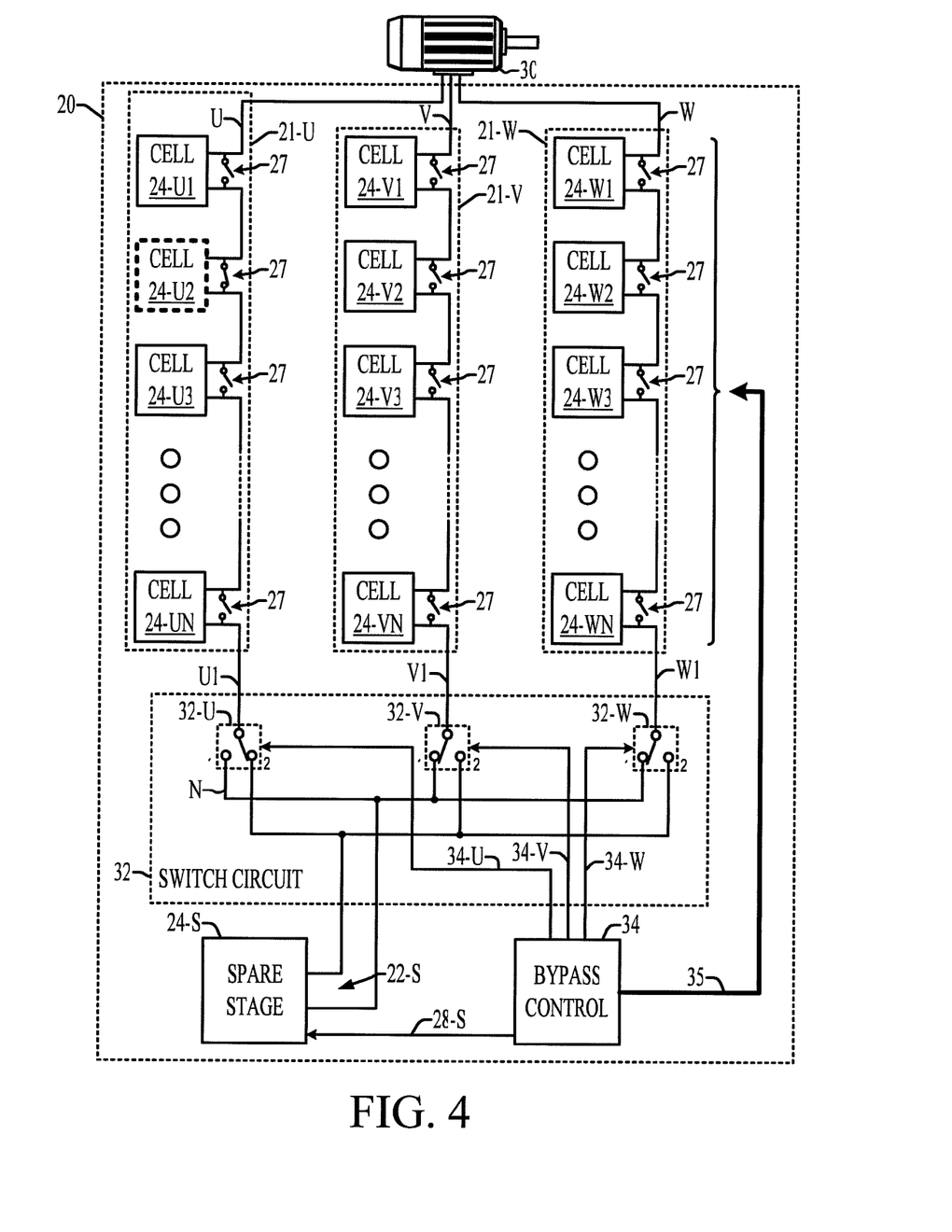

Referring also to FIG. 4, the bypass control circuit 34 in certain examples is triggered by detection of a fault in a given one of the inverter stages 24 to place the switch circuit 32 into the second operating mode by actuating one of the select control signals 34-U, 34-V or 34-W. In certain examples, the bypass control circuit 34 also operates bypass switches of the stages 24 (e.g., switches 27 in FIG. 4) to cause the faulted stage 24 to be bypassed. In the second mode, a selected one of the nodes U1, V1 or W1 is connected to the spare stage 24-S by putting the corresponding switch 32-U, 32-V and 32-W in the second position or state, while maintaining the other switches in the first position. In certain examples, the bypass control circuit 34 can place the switch circuit 32 into the second operating mode by actuating one of the select control signals 34-U, 34-V or 34-W according to a scheduled maintenance or by user actuation to restore the aluminum oxide of the capacitor (s) of the spare stage 24-S by use in operation to drive the motor load 30. When an inverter stage 24 is identified as faulted, such as stage 24-U2 of the first phase leg circuit 21-U in FIG. 4, the bypass control circuit 34 operates the switch 27 associated with the stage 24-U2, and places the switch 32-U in the second position is shown in FIG. 4.

In this example of second mode operation, the switch circuit 32 connects the spare stage 24-S in series with the non-bypassed cells of the phase leg circuit 21-U between the output node U and the neutral N. In this configuration, moreover, there are an integer number N operating stages 24, 24-S associated with the motor phase output U, and an equal number N operating stages 24 of the phase leg circuits 21-V and 21-W operating in the multiphase inverter 20. The control circuit (e.g., FIG. 1) provides switching control signals 28 to the stages 24 of the reconfigured phase leg circuits 21 without having to modify it close loop control modulation index in order to continue driving the motor load 30. As seen in FIG. 4, the bypass control circuit 34 in one example provides switching control signals 28-S to the spare stage 24-S in the second operating mode, for example, by routing the switching control signals that would otherwise have been provided to the bypassed stage 24-U2. The spare cell(s) 24-S is/are energized as "hot spares" thus there is no need to periodically reform the dielectric aluminum oxide layer of the electrolytic capacitors in the power cell.

Figure 5:
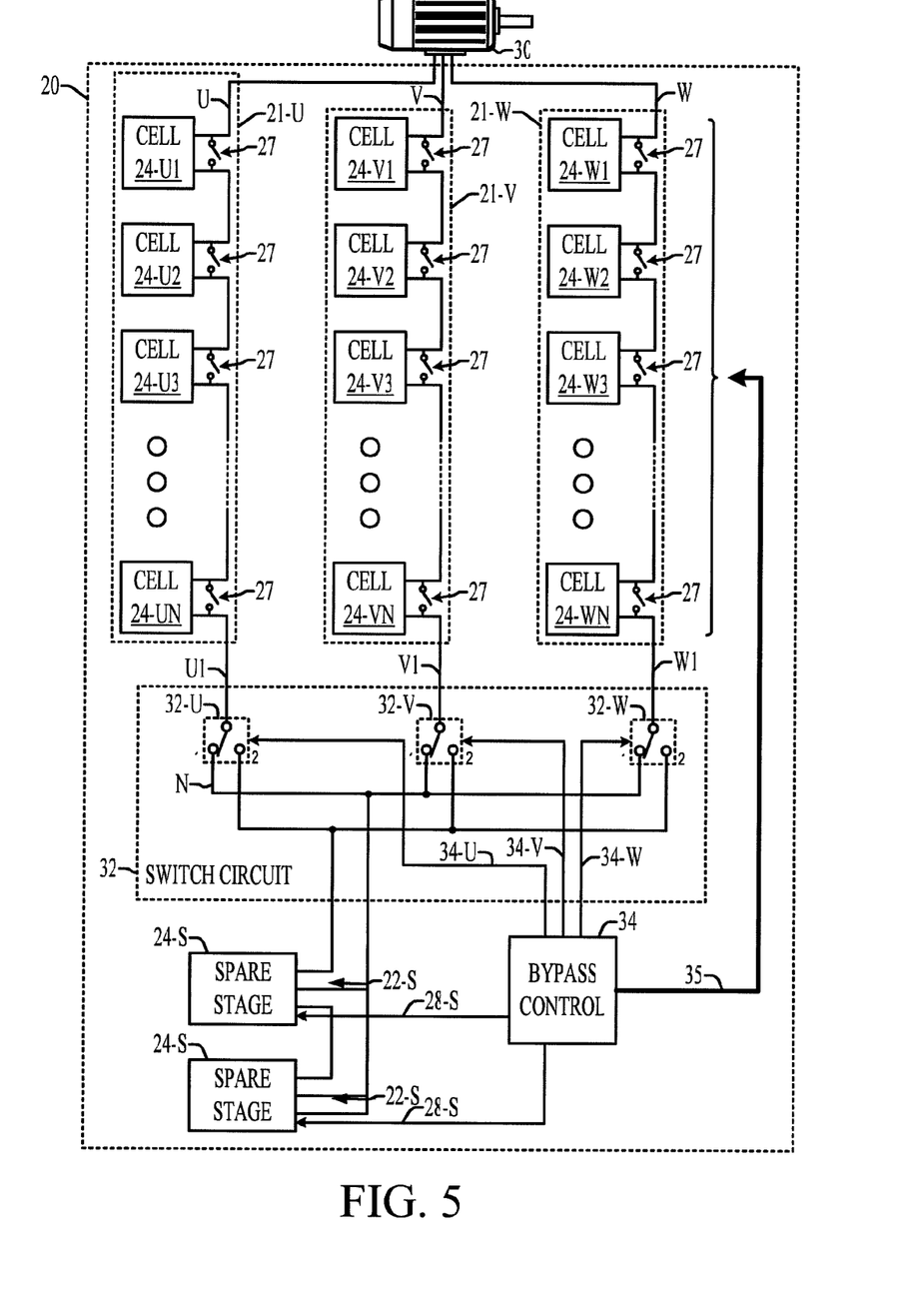
Figure 6:
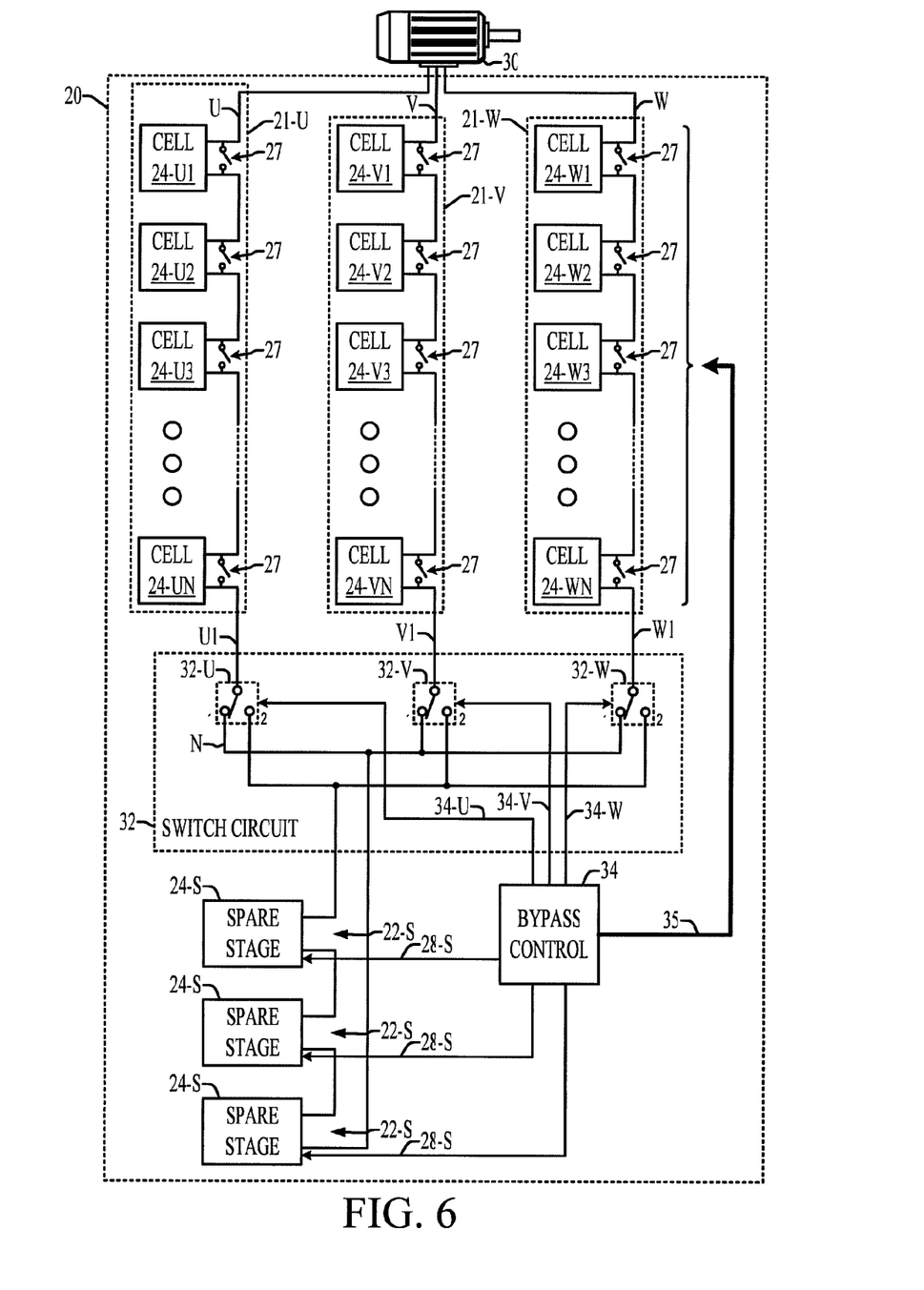

Referring also to FIGS. 5 and 6, n+2 or higher levels of redundancy can be implemented using two or more spare stages stage 24-S connected in series with one another between the switching circuit 32 and the neutral N. In FIG. 5, two spare stages 24-S are provided. FIG. 6 shows another example including three spare stages 24-S connected in series with one another between the switch circuit 32 and the neutral N. In the example of FIG. 5, the bypass control circuit 34 can accommodate bypassing of single or multiple faulted cells or stages 24 in one of the phase leg circuits 21. In the case of one faulted stage 24, the bypass control circuit 34 provides the control signals 35 so as to close the bypass switch 27 of the faulted stage 24, and also closes the bypass switch 27 of another stage 24 in the same phase leg circuit 21, while also changing the associated selection switch 32 to the second position to connect that phase leg circuit 21 with the series combination of the spare stages 24. For situations in which to stages 24 of a given phase leg circuit 21 are concurrently faulted, the bypass control circuit 34 closes the corresponding bypass switches 27, and changes the switch 32 of that phase leg circuit 21 to the second position. Similar operation can be used for the example of FIG. 6 to selectively add three spare stages 24-S into a selected one of the phase leg circuits 21.

Figure 7:
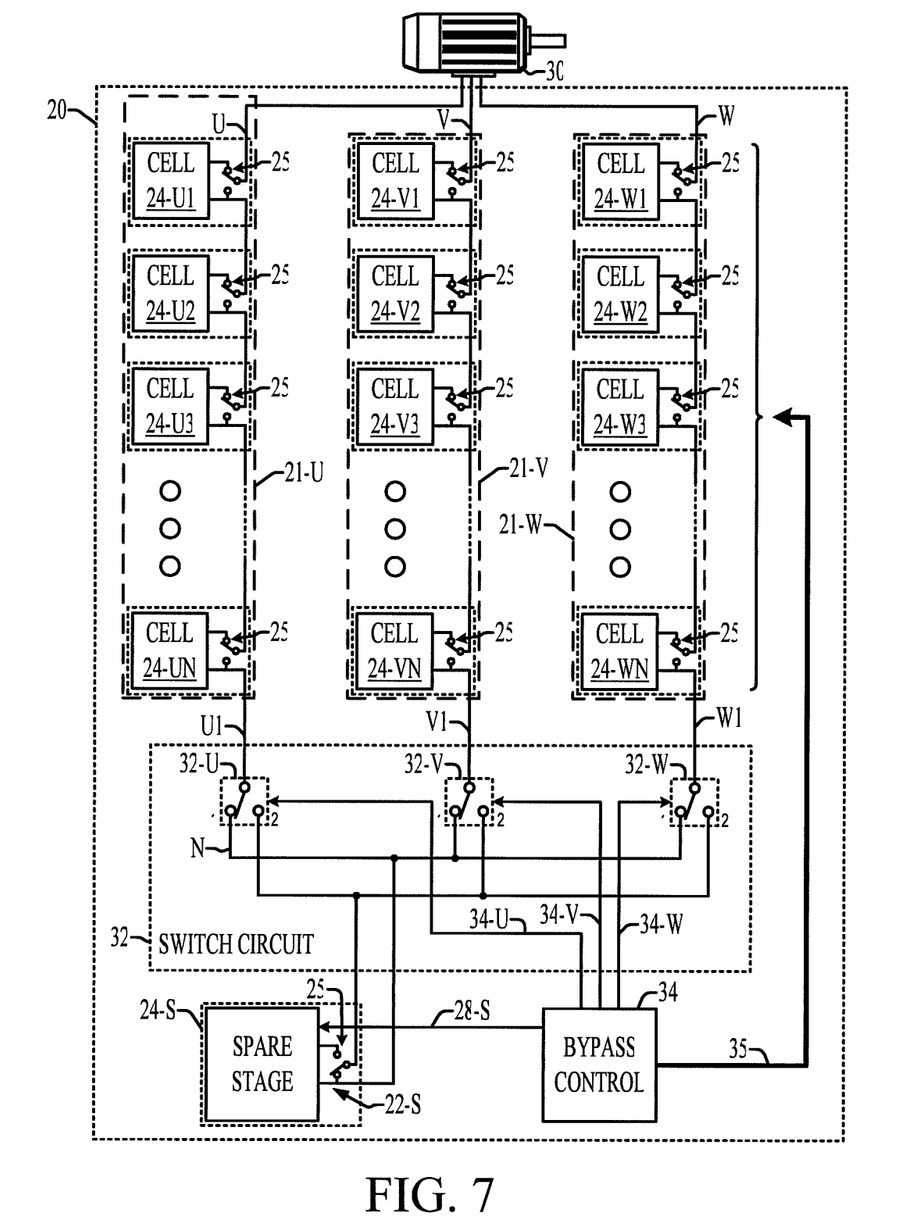

FIG. 7 shows another example in which internal bypass switches 25 are provided in the individual stages 24, which can be operated by the bypass control signals 35 from the bypass control circuit 34. As seen in this example, moreover, the spare stage 24-S can also include an internal bypass switch 25

Figure 8:
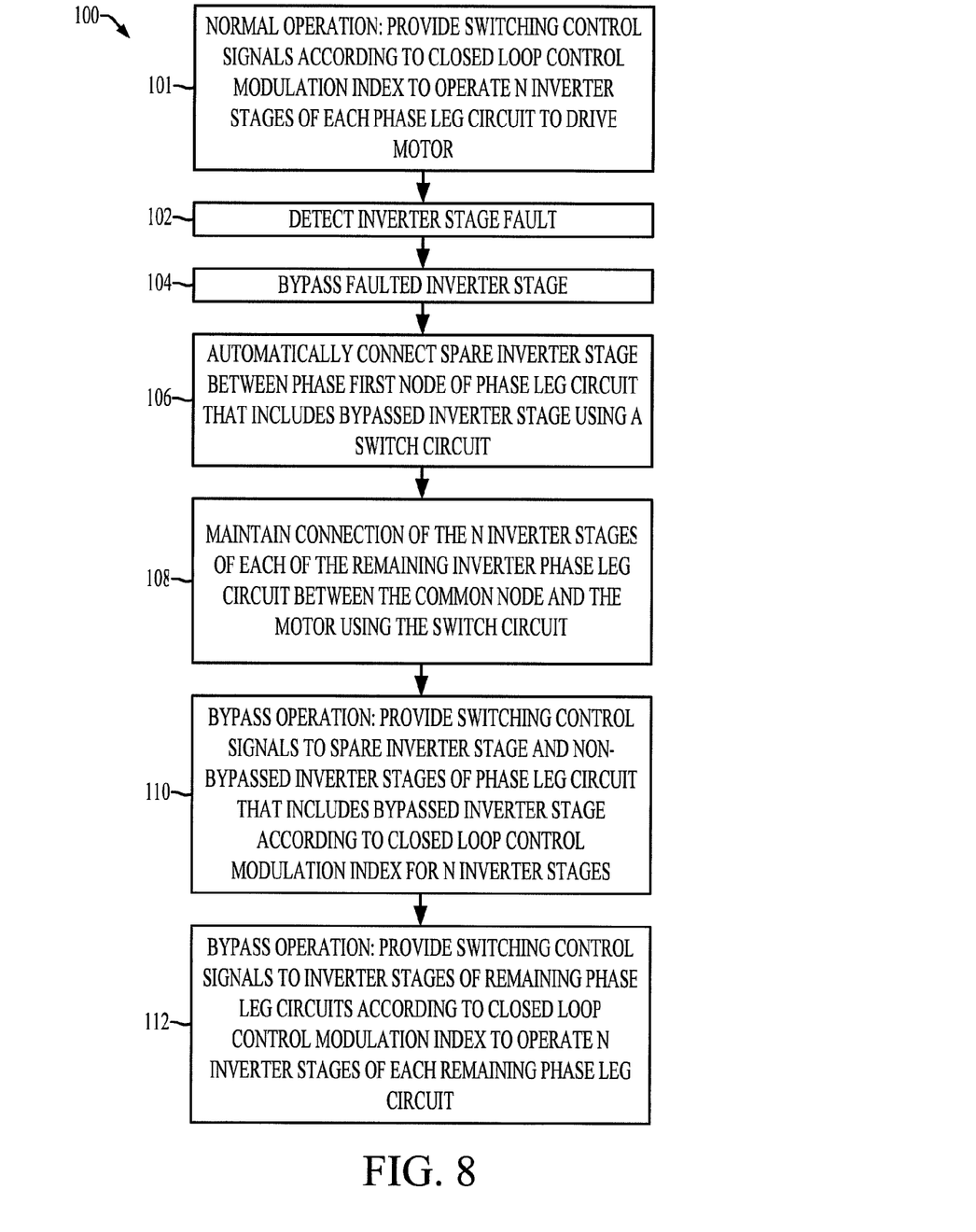
FIG. 8 is a flow diagram.

Referring now to FIG. 8, a method 100 is illustrated for providing bypass redundancy for a multiphase multilevel inverter 20 having an integer number N inverter stages 24 connected in series between an inverter phase output node U, V, W and a corresponding inverter phase first node U1, V1, W1 in each of a plurality of inverter phase leg circuits 21-U, 21-V, 21-W. The method 100 can be implemented in certain examples by a motor drive controller, such as the controller 26 and the bypass control circuit 34 described above. The method 100 begins at 101 in normal operation in which the controller 26 provides switching control signals 28 according to a closed loop control modulation index to operate an integer number N inverter stages of each phase leg circuit 21 in order to drive the motor load 30. At 102, the controller 26 detects a fault in a given inverter stage 24 of a corresponding given inverter phase leg circuit 21. The controller 26 bypasses the faulted given stage 24 at 104, and automatically connects the spare inverter stage or stages 24-S at 106 between the common node N and the given inverter phase leg circuit 21 using the switch circuit 32 in response. Also, the controller 26 maintains connection at 108 of the N inverter stages of the remaining inverter phase leg circuits 21 between the common node N and the load 30 using the switch circuit 32. At 110, the controller provides the switching control signals 28-S to the spare inverter stage 24-S and provides the switching control signals 28 to the remaining N−1 non-bypassed inverter stages 24 of the given inverter phase leg circuit 21 according to the closed loop control modulation index for N inverter stages, and at 112 the controller 26 provides the switching control signals 28 to the N inverter stages of the remaining inverter phase leg circuits 21 according to the closed loop control modulation index to operate the N inverter stages of each of the remaining inverter phase leg circuit 21.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, the terms "couple", "couples", or "coupled" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

The following is claimed:

1. A multiphase multilevel inverter, comprising:
   a plurality of inverter phase leg circuits, each phase leg circuit including a plurality of inverter stages connected in series between a corresponding one of a plurality of inverter phase output nodes and a corresponding one of a plurality of inverter phase first nodes to provide a phase voltage signal at the corresponding inverter phase output node, each inverter stage comprising:
   an inverter stage output, and
   a switching circuit including a plurality of switching devices coupled between a corresponding DC voltage source and the inverter stage output, the switching circuit operative to provide an output voltage having an amplitude of one of at least two discrete levels at the inverter stage output according to a plurality of switching control signals; and
   a spare stage system, including:
   a spare inverter stage, including a spare stage output, and a spare stage switching circuit including a plurality of spare stage switching devices coupled between a spare stage DC voltage source and the spare stage output, the spare stage switching circuit operative to provide an output voltage having an amplitude of one of at least two discrete levels at the spare stage output according to a plurality of spare stage switching control signals, and
   a switch circuit operative in a first mode to connect all the inverter phase first nodes to a common connection node, and in a second mode to connect the spare inverter stage between a selected one of the plurality of the inverter phase first nodes and the common connection node and to connect remaining inverter phase first nodes with the common connection node.

2. The multiphase multilevel inverter of claim 1, further comprising a bypass control circuit to provide a select control signal to place the switch circuit in the second mode and to cause the switch circuit to connect the spare inverter stage between the selected one of the plurality of the inverter phase first nodes and the common connection node in response to bypassing of a given one of the plurality of the inverter stages in one of the plurality of the inverter phase leg circuits that includes the selected one of the plurality of the inverter phase first nodes.

3. The multiphase multilevel inverter of claim 2, wherein the bypass control circuit provides a bypass signal to bypass the given one of the plurality of the inverter stages, and provides the select control signal to cause the switch circuit to connect the spare inverter stage between the plurality of the inverter phase first nodes of the plurality of the inverter phase leg circuits that includes the given one of the plurality of the inverter stages.

4. The multiphase multilevel inverter of claim 1, wherein the inverter stages are H-bridge stages individually comprising four switching devices coupled between the corresponding DC voltage source and the corresponding inverter stage output, the inverter stages individually operative to provide an output voltage having an amplitude of one of at least two discrete levels at the corresponding inverter stage output according to the switching control signals.

5. The multiphase multilevel inverter of claim 1, wherein the spare inverter stage is an H-bridge stage comprising four switching devices coupled between the spare stage DC voltage source and the spare stage output.

6. The multiphase multilevel inverter of claim 1, wherein the spare stage system further includes a second spare inverter stage, including a second spare stage output connected in series with the spare stage output, and a spare stage switching circuit including a second plurality of spare stage switching devices coupled between a second spare stage DC voltage source and the second spare stage output, the second spare stage switching circuit operative to provide an output voltage having an amplitude of one of at least two discrete levels at the second spare stage output according to a second plurality of spare stage switching control signals; and wherein the switch circuit is operative in the second mode to connect the spare inverter stages between the selected one of the plurality of the inverter phase first nodes and the common connection node and to connect the remaining inverter phase first nodes with the common connection node.

7. The multiphase multilevel inverter of claim 6, further comprising a bypass control circuit to provide a select control signal to place the switch circuit in the second mode and to cause the switch circuit to connect the spare inverter stages between the selected one of the plurality of the inverter phase first nodes and the common connection node.

8. The multiphase multilevel inverter of claim 7, wherein the bypass control circuit provides a bypass signal to bypass the given one of the plurality of the inverter stages, and provides the select control signal to cause the switch circuit to connect the spare inverter stages between the selected one of the plurality of the inverter phase first nodes of the plurality of the inverter phase leg circuits that includes the given one of the inverter stages.

9. The multiphase multilevel inverter of claim 1, further comprising a plurality of external bypass switch circuits individually coupled to selectively bypass the inverter stage output of one of the plurality of the inverter stages.

10. The multiphase multilevel inverter of claim 1, wherein the individual inverter stages include an internal bypass switch circuit to selectively bypass the inverter stage output of the inverter stage.

11. A spare stage system to provide bypass redundancy for a multiphase multilevel inverter having a plurality of inverter stages connected in series between an inverter phase output node and a corresponding one of a plurality of inverter phase first nodes in each of a plurality of inverter phase leg circuits, the spare stage system comprising:
    a spare inverter stage, including a spare stage output, and a spare stage switching circuit including a plurality of spare stage switching devices coupled between a spare stage DC voltage source and the spare stage output, the spare stage switching circuit operative to provide an output voltage having an amplitude of one of at least two discrete levels at the spare stage output according to a plurality of spare stage switching control signals; and
    a switch circuit operative in a first mode to connect all the plurality of the inverter phase first nodes to a common connection node, and in a second mode to connect the spare inverter stage between a selected one of the plurality of the inverter phase first nodes and the common connection node and to connect remaining inverter phase first nodes with the common connection node.

12. The spare stage system of claim 11, further comprising a bypass control circuit to provide a select control signal to place the switch circuit in the second mode and to cause the switch circuit to connect the spare inverter stage between the selected one of the plurality of the inverter phase first nodes and the common connection node in response to bypassing of a given one of the plurality of the inverter stages in one of the plurality of the inverter phase leg circuits that includes the selected one of the plurality of the inverter phase first nodes.

13. The spare stage system of claim 12, wherein the bypass control circuit provides a bypass signal to bypass the given one of the plurality of the inverter stages, and provides the select control signal to cause the switch circuit to connect the spare inverter stage between the selected one of the plurality of the inverter phase first nodes of the plurality of the inverter phase leg circuits that includes the given one of the plurality of the inverter stages.

14. The spare stage system of claim 12, wherein the spare inverter stage is an H-bridge stage comprising four switching devices coupled between the spare stage DC voltage source and the spare stage output.

15. The spare stage system of claim 12, further comprising a second spare inverter stage, including a second spare stage output connected in series with the spare stage output, and a spare stage switching circuit including a second plurality of spare stage switching devices coupled between a second spare stage DC voltage source and the second spare stage output, the second spare stage switching circuit operative to provide an output voltage having an amplitude of one of at least two discrete levels at the second spare stage output according to a second plurality of spare stage switching control signals;
    wherein the switch circuit is operative in the second mode to connect the spare inverter stages between the selected one of the plurality of the inverter phase first nodes and the common connection node and to connect the remaining inverter phase first nodes with the common connection node.

16. The spare stage system of claim 11, further comprising a second spare inverter stage, including a second spare stage output connected in series with the spare stage output, and a spare stage switching circuit including a second plurality of spare stage switching devices coupled between a second spare stage DC voltage source and the second spare stage output, the second spare stage switching circuit operative to provide an output voltage having an amplitude of one of at least two discrete levels at the second spare stage output according to a second plurality of spare stage switching control signals;
    wherein the switch circuit is operative in the second mode to connect the spare inverter stages between the selected one of the plurality of the inverter phase first nodes and the common connection node and to connect the remaining inverter phase first nodes with the common connection node.

17. The spare stage system of claim 11, wherein the spare inverter stage is an H-bridge stage comprising four switching devices coupled between the spare stage DC voltage source and the spare stage output.

18. A method to provide bypass redundancy for a multiphase multilevel inverter having N inverter stages connected in series between an inverter phase output node and a corresponding inverter phase first node in each of a plurality of inverter phase leg circuits, wherein N is an integer number and greater than 1, the method comprising:
    detecting a fault in a given inverter stage of a given inverter phase leg circuit;
    bypassing an output circuit of a given inverter stage in response to detecting the fault in the given inverter stage; and
    automatically connecting a spare inverter stage between a common node and the given inverter phase leg circuit using a switch circuit in response to detecting the fault in the given inverter stage.

19. The method of claim 18, further comprising:
    providing switching control signals to the spare inverter stage and providing switching control signals to N−1 non-bypassed inverter stages of the given inverter phase leg circuit according to a closed loop control modulation index for the N inverter stages; and providing switching control signals to the N inverter stages of remaining inverter phase leg circuits according to the closed loop control modulation index to operate the N inverter stages of each of the remaining inverter phase leg circuits.

20. The method of claim 19, comprising maintaining connection of the N inverter stages of each of the remaining inverter phase leg circuits between the common node and a load using the switch circuit.

\* \* \* \* \*